US010573185B2

(12) United States Patent
Scarlatti et al.

(10) Patent No.: US 10,573,185 B2
(45) Date of Patent: Feb. 25, 2020

(54) SYSTEM AND METHOD TO PROTECT THE PRIVACY OF ADS-B MESSAGES

(71) Applicant: The Boeing Company, Chicago, IL (US)

(72) Inventors: David Scarlatti, Madrid (ES); Enrique Casado, Madrid (ES); David Esteban-Campillo, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 401 days.

(21) Appl. No.: 15/478,417

(22) Filed: Apr. 4, 2017

(65) Prior Publication Data

US 2017/0358214 A1 Dec. 14, 2017

(30) Foreign Application Priority Data

Jun. 14, 2016 (EP) .................................. 16382272

(51) Int. Cl.
*G08G 5/00* (2006.01)
*G01S 19/01* (2010.01)
*G01S 19/02* (2010.01)

(52) U.S. Cl.
CPC .......... *G08G 5/0013* (2013.01); *G01S 19/015* (2013.01); *G01S 19/02* (2013.01)

(58) Field of Classification Search
CPC combination set(s) only.
See application file for complete search history.

(56) References Cited

U.S. PATENT DOCUMENTS

| 2011/0057830 | A1* | 3/2011 | Sampigethaya | ...... G01S 5/0072 342/36 |
| 2012/0133552 | A1* | 5/2012 | Wu | ........................ G01S 19/10 342/357.23 |
| 2014/0327564 | A1* | 11/2014 | Sampigethaya | ...... H04L 9/3215 342/32 |
| 2014/0327581 | A1 | 11/2014 | Murphy et al. | |
| 2015/0331099 | A1* | 11/2015 | Wu | ....................... G01S 13/876 342/32 |

OTHER PUBLICATIONS

European Patent Office; Examination Report issued in European Patent Application No. EP16382272.9; dated Feb. 17, 2017.

* cited by examiner

*Primary Examiner* — Mamadou L Diallo
(74) *Attorney, Agent, or Firm* — Parsons Behle & Latimer

(57) ABSTRACT

System and method to protect the privacy of ADS-B messages transmitted by aircraft. The system includes one or more ground stations with a ground station control unit and a ground ADS-B transponder for receiving an ADS-B message. The ground station control unit includes an aircraft position determination module for retrieving an aircraft position included in the ADS-B message; an operating conditions module for determining the fulfillment of operating conditions including determining if the aircraft position is an actual aircraft position; and a fake aircraft position generator for computing one or more fake aircraft positions. The ground station control unit broadcasts one or more fake ADS-B messages including the fake aircraft positions if the operating conditions are met. With this system only trusted receivers can obtain the real position of the aircraft.

20 Claims, 10 Drawing Sheets

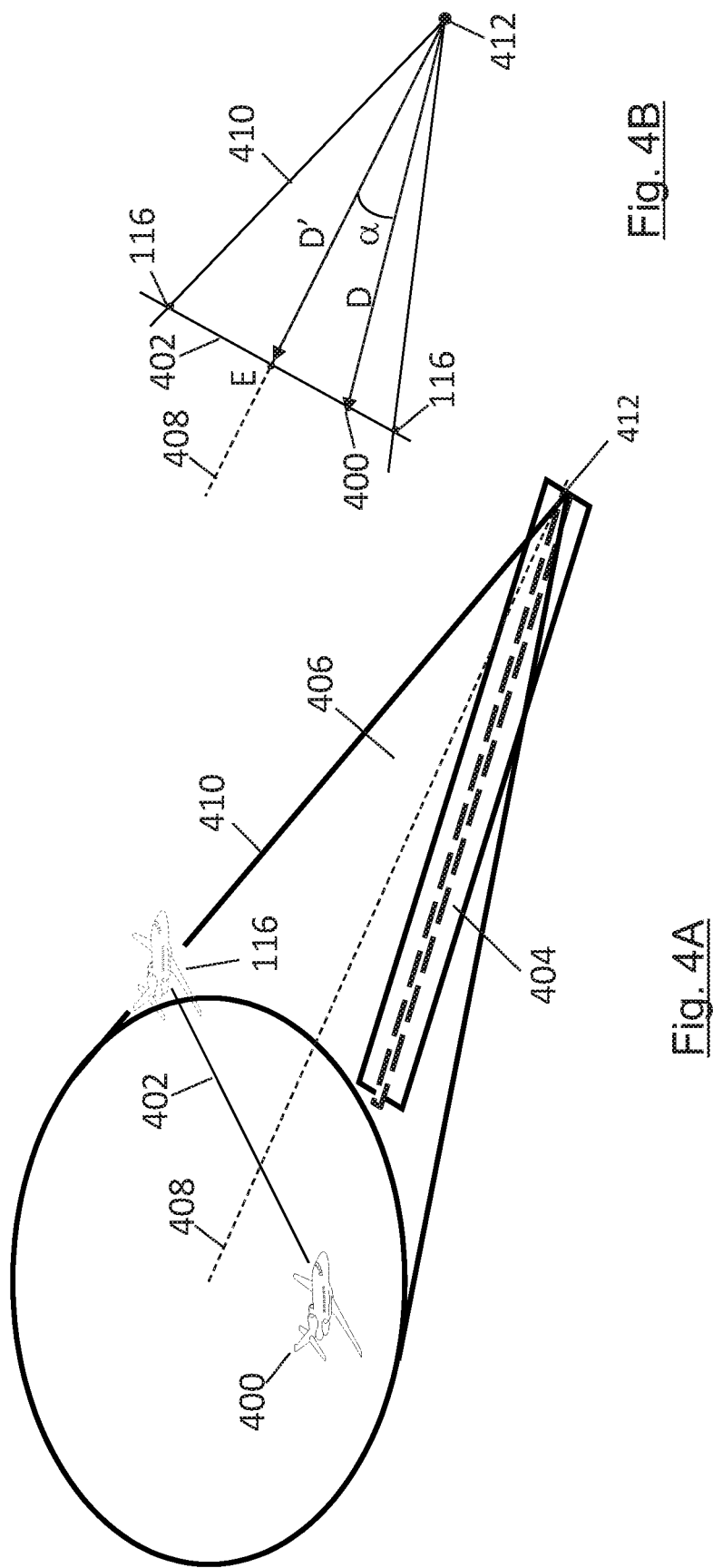

SYSTEM AND METHOD TO PROTECT THE PRIVACY OF ADS-B MESSAGES

CROSS-REFERENCE TO RELATED APPLICATIONS

This application claims the benefit of, and priority to, European Patent Application No. 16382272.9, filed on Jun. 14, 2016 and entitled "System and method to protect the privacy of ADS-B messages," the contents of which are herein incorporated by reference in their entirety.

FIELD OF THE INVENTION

The present disclosure relates generally to the field of avionics. More particularly, the present disclosure relates to methods and systems for protecting the privacy of real-time aircraft position in ADS-B data broadcast to avoid malicious attacks.

BACKGROUND OF THE INVENTION

Automatic dependent surveillance-broadcast (ADS-B) is a surveillance technology for tracking aircraft. There are several types of certified ADS-B data links: 978 MHz universal access transceiver (UAT) and 1090 MHz extended squitter (ES).

Aircraft equipped with ADS-B Out service periodically broadcasts real-time aircraft information through an onboard transmitter, including the aircraft identification, current position, altitude, and velocity.

In all cases ADS-B data is publicly available since it is unencrypted and can be collected with any compatible radio receiver.

Therefore, there is a need to safeguard the privacy of an aircraft precise location.

SUMMARY OF THE INVENTION

Currently, aircraft positions are widely available to anyone in the public. The present disclosure refers to a system and method to protect the privacy of ADS-B messages transmitted by aircraft, addressing this new threat by generating fake aircraft positions such that only trusted receivers can know the real position of the aircraft.

In accordance with one aspect of the present disclosure there is provided a system for protecting the privacy of ADS-B messages. The system includes one or more ground stations. Each ground station includes a ground station control unit and a ground ADS-B transponder for receiving an ADS-B message. The ground station control unit includes:

An aircraft position determination module for retrieving an aircraft position included in the ADS-B message.

An operating conditions module for determining the fulfillment of one or more operating conditions, said operating conditions at least including determining if the aircraft position is an actual aircraft position.

A fake aircraft position generator for computing one or more fake aircraft positions.

The ground station control unit is configured for broadcasting one or more fake ADS-B messages including the fake aircraft positions if the operating conditions are met.

The operating conditions may also include determining if the aircraft position is located inside a region of interest.

The fake aircraft position generator preferably computes the fake aircraft positions by using a transformation function. The operating conditions module may be configured to determine if the aircraft position is an actual aircraft position by using the transformation function. The transformation function is such that when applied to an actual aircraft position generates the fake aircraft positions, and when applied to a fake aircraft position generates at least the same fake aircraft position.

In an embodiment, the transformation function is a geometric projective transformation over a surface. The region of interest may be defined by the surface used in the geometric projective transformation. The geometric projective transformation may be, for instance, a projection over a conical surface, a convex surface (such as a hyperbolic surface) or a frustum surface.

In accordance with a further aspect of the present disclosure there is provided a method of protecting the privacy of ADS-B messages. The method includes:

Receiving an ADS-B message.

Retrieving an aircraft position included in the ADS-B message.

Determining the fulfillment of one or more operating conditions, said operating conditions at least including determining if the aircraft position is an actual aircraft position.

If the operating conditions are met generating one or more fake aircraft positions and broadcasting one or more fake ADS-B messages including the fake aircraft positions.

The ADS-B obfuscation method is used by ground-based stations to generate fake aircraft positions when certain conditions are met. The ADS-B obfuscation method is particularly useful when the aircraft is flying low, near an airport (during landing or take-off). Fake aircraft positions are broadcast to prevent the actual aircraft position being identified by unintended users. Trusted receivers share with the ground stations a key to differentiate fake aircraft positions from real aircraft positions.

The ADS-B aircraft position obfuscation is performed in dangerous areas. The system and method allows creating an area where only trusted parties can use ADS-B data, for instance a terminal maneuvering area. The system generates, starting from real position messages, a set of fake messages that only trusted partners can distinguish from the real ones. In a region of interest a receiver feeds a system generating the fake messages and then an emitter transmits it to all the receivers in the area. The trusted receivers also use the obfuscation algorithm to differentiate the real message from the fake ones.

The system generates multiple fake trajectories indistinguishable from the real one, such that only trusted receivers can know the real position of the aircraft. The ADS-B obfuscation algorithm generating the fake trajectories is tailored to a region of interest (an area to protect). With the system in operation use of ADS-B data requires an exchange of keys used for generating the fake messages and the algorithms for reversing the obfuscation. This way, the system can determine the trusted receivers which can use the ADS-B data broadcast in a region of interest. Another advantage of the present disclosure is that a certain trusted receiver can immediately be revoked by just changing the key parameters of the obfuscation algorithm (the new key parameters will not be distributed to untrusted receivers).

The features, functions, and advantages that have been discussed can be achieved independently in various embodiments or may be combined in yet other embodiments further details of which can be seen with reference to the following description and drawings.

BRIEF DESCRIPTION OF THE DRAWINGS

A series of drawings which aid in better understanding the invention and which are expressly related with an embodiment of said invention, presented as a non-limiting example thereof, are very briefly described below.

FIGS. 4A-4C represent a conic mirroring process for obtaining the fake aircraft positions.

DETAILED DESCRIPTION

Figure 1:
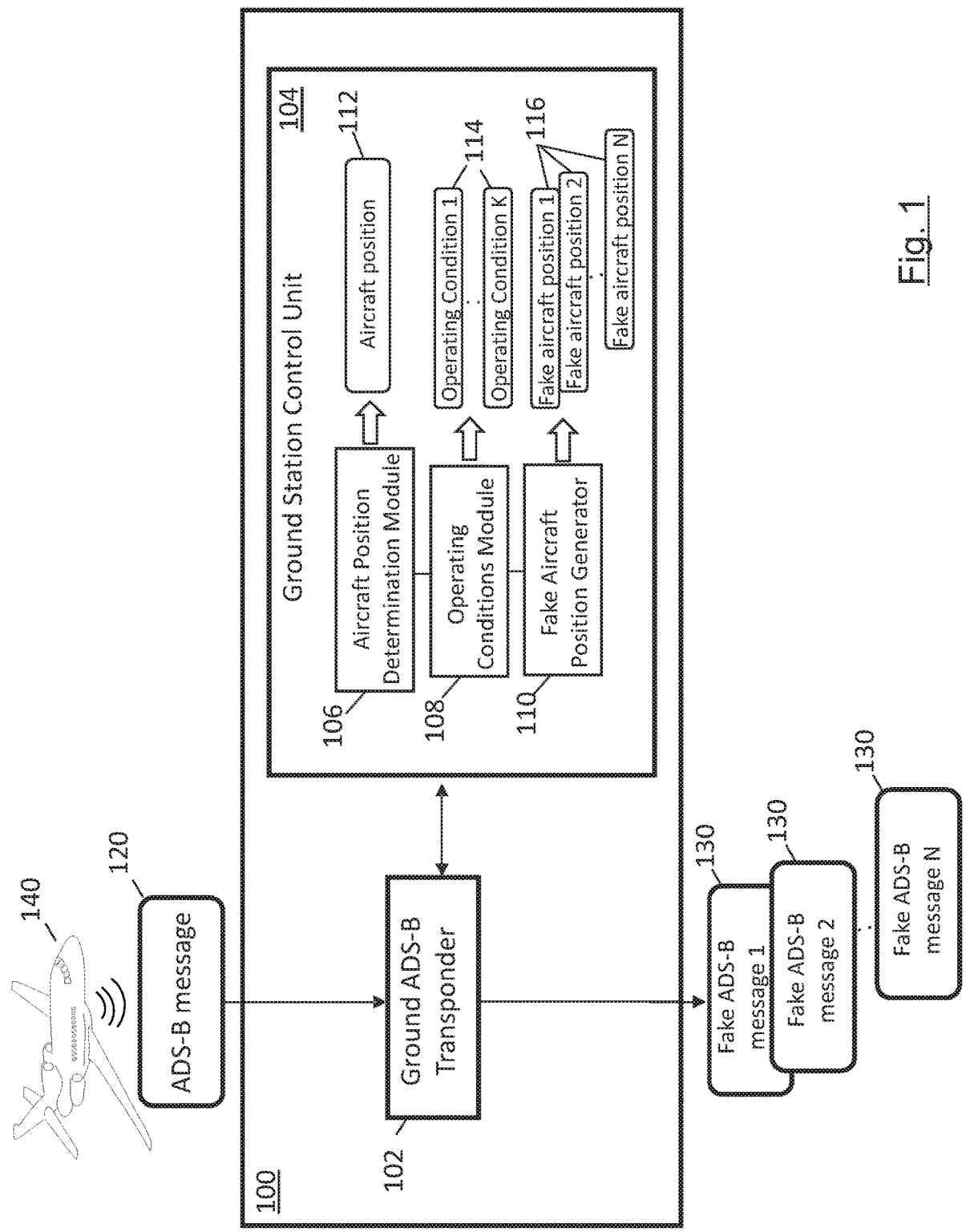
FIG. 1 depicts a schematic diagram of a system for protecting the privacy of ADS-B messages transmitted by an aircraft.

FIG. 1 represents a schematic diagram of an embodiment of a system for protecting the privacy of ADS-B messages transmitted by an aircraft. The system includes one or more ground stations 100. Each ground station 100 is a ground-based infrastructure comprising a ground ADS-B transponder 102 (ADS-B receiver and ADS-B emitter) coupled to a ground station control unit 104. The ground station 100 is preferably located close to an airport.

An aircraft 140 using ADS-B services periodically emits ADS-B messages 120 including, among other data, the aircraft identifier, current aircraft position 112 and aircraft speed. When the aircraft 140 is flying near the ground station 100, the ADS-B message 120 is received by the ground ADS-B transponder 102. Thereafter, an aircraft position determination module 106 of the ground station control unit 104 analyzes the ADS-B message 120, retrieving the aircraft position 112 and determining whether this aircraft position 112 is located inside a region of interest or not. The region of interest is a first filter used by the ground station control unit 104 to determine if fake ADS-B messages are to be transmitted. As it will later be explained, additional filters or conditions may be used.

An operating conditions module 108 included in the ground station control unit 104 is responsible for determining if one or more operating conditions 114 are met. The operating conditions 114 at least include the condition of the aircraft position 112 being located inside the region of interest. If the operating conditions 114 are met, a fake aircraft position generator 110 computes at least one fake aircraft position 116 and the ground station control unit 104 broadcast, using the ground ADS-B transponder 102, at least one ADS-B message 130 including the fake aircraft positions 116.

Figure 2:
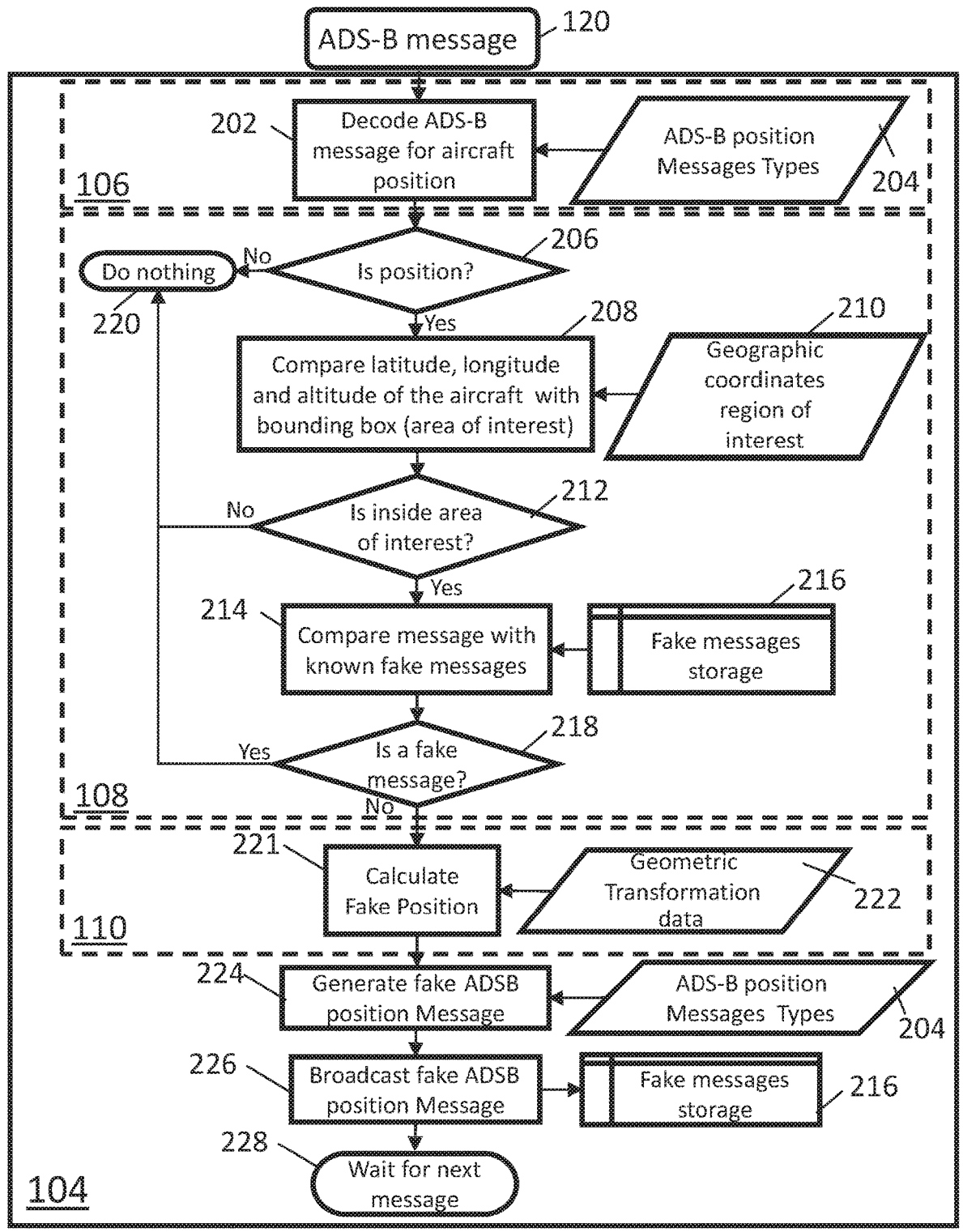
FIG. 2 represents a flow diagram of the ADS-B obfuscation algorithm.

FIG. 2 depicts a flow diagram showing the steps of a method of protecting the privacy of ADS-B messages according to a possible embodiment, implemented by the ground station control unit 104. An ADS-B message 120 is received and decoded 202 to obtain the aircraft position included in the message, taking into account the ADS-B position messages types 204 previously stored. In 206 a check to obtain a position of the aircraft (including the latitude, longitude and altitude of the aircraft) is performed. If no position can be retrieved, no further action is taken 220. If a position is obtained, said position is compared 208 with a region of interest, considering the geographic coordinates of the region of interest 210 previously stored.

If the aircraft position is inside the region of interest 212, the received ADS-B message is compared 214 with a plurality of fake messages stored in a fake messages database 216. Otherwise, no further action is taken 220.

If the received ADS-message is a fake message 218, a computation 221 to obtain one or more fake aircraft positions is performed. Otherwise, no further action is taken 220.

According to the embodiment shown in FIG. 2, the computation 221 includes a geometric projective transformation taking into account some geometric transformation data 222 previously obtained or stored in a memory or a database.

Once a fake aircraft position is computed 221, a fake ADS-B position message is generated 224 and broadcast 226. If several fake aircraft positions are obtained, the same number of ADS-B messages including said fake aircraft positions are generated and broadcast. When the last fake ADS-B message is broadcast, the system keeps waiting 228 for the next ADS-B message to be received.

Figure 3:
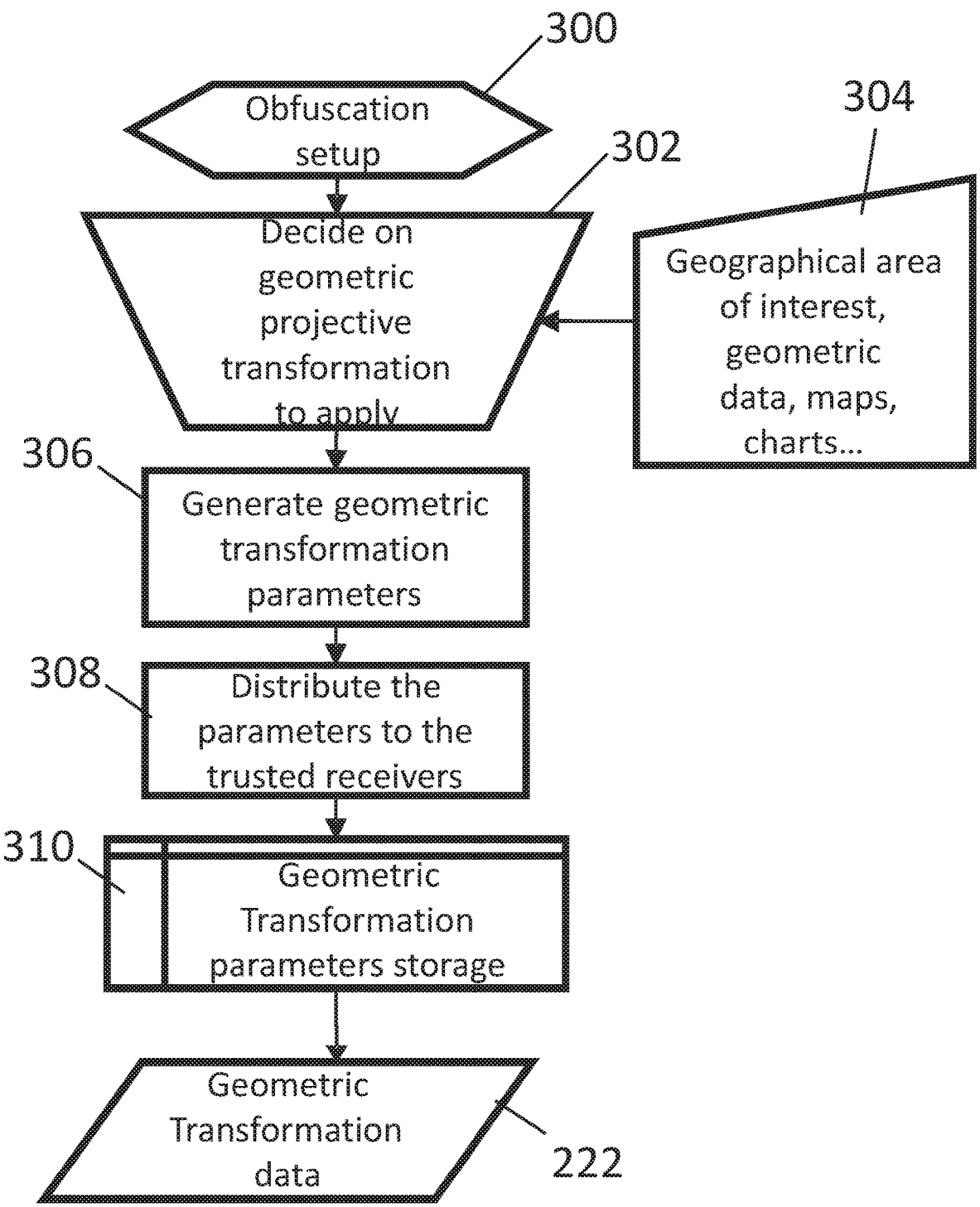
FIG. 3 illustrates the process of obtaining the geometric transformation data used by the ADS-B obfuscation algorithm.

As shown in FIG. 2, geometric transformation data 222 can be employed for the calculation of fake aircraft positions. FIG. 3 shows an obfuscation process of obtaining the geometric transformation data 222 according to an embodiment. First, a setup 300 of the obfuscation process is established. In 302 the type of geometric projective transformation to apply is selected, such as convex mirroring or conic mirroring. Several relevant data required for the selected geometric projective transformation is retrieved from a memory or repository 304. The relevant data may include, for instance, the geographical parameters of the region of interest, maps, charts, etc.

A set of geometric transformation parameters are then generated 306 and distributed 308 to one or more trusted receivers, including the ground station control unit 104. The geometric transformation parameters are stored in a repository 310. By accessing the repository 310, the geometric transformation data 222 is retrieved to calculate fake aircraft positions.

FIGS. 4A and 4B represent an example of a geometric projective transformation of an aircraft position using conic mirroring or conical projection on a conical/lateral surface 410 of a cone 406 aligned with a runway 404, the vertex 412 of the cone in the aiming point area of the runway 404, the cone 406 with a length such that it covers the region of interest.

The schematic view of an aircraft 140 approaching a ground station 100 is depicted in FIG. 4A, the ground station 100 being located close to a runway 404. For every actual aircraft position 400 inside the cone 406 (which can be considered the region of interest), a fake aircraft position 116 is computed as the intersection of a line 402 perpendicular to the cone axis 408 with the lateral surface 410 of the cone. The vertex 412 of the cone may coincide with the location of the ground station 100, although the ground station 100 may be positioned at a different location.

FIG. 4B depicts a projected view of FIG. 4A, showing the intersection E of the orthogonal line 402 with axis 408, the line segment D from the vertex 412 to the actual aircraft position 400, the line segment D' from the vertex 412 to the intersection E and the angle α between line segment D and axis 408. As shown in FIG. 4B, the line 402 can also be extended on both sides to intersect the lateral surfaces 410 of the cone at two different points, obtaining two fake aircraft position 116.

Figure 4C:
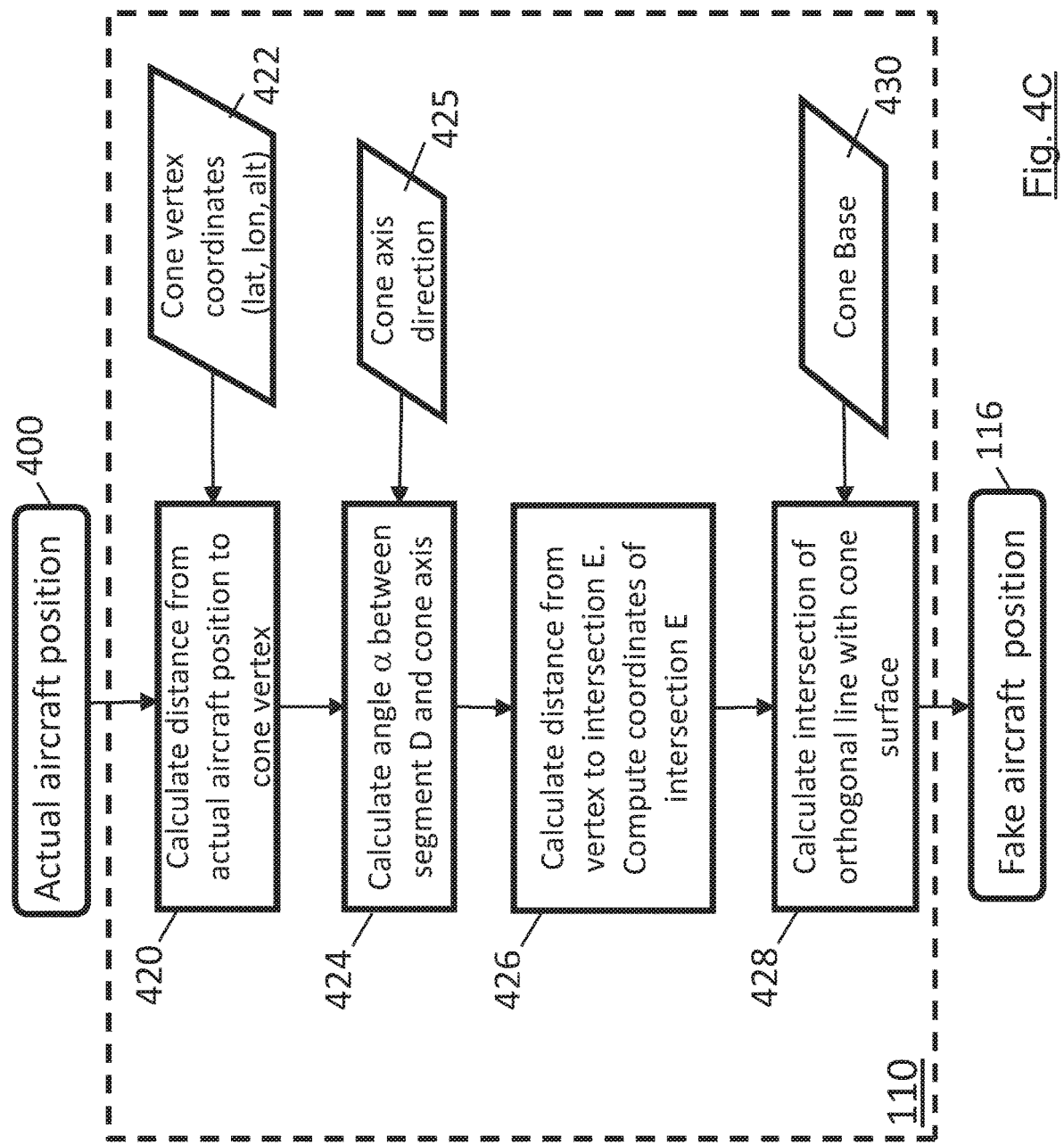

FIG. 4C represents a flow diagram of the conic mirroring process of FIGS. 4A and 4B. Using the actual aircraft position 400 (latitude, longitude, altitude), the fake aircraft position generator 110:

- Calculates 420 the distance from the actual aircraft position 400 to the cone vertex 412 (length of line segment D), using the established cone vertex coordinates 422.
- Calculates 424 the angle α between segment D and cone axis 408, using the known cone axis direction 425.
- Calculates 426 the distance from vertex 412 to intersection E (length of line segment D') and computes the coordinates of intersection E.
- Calculates 428 the intersection of orthogonal line 402 with conical surface 410 using the cone base 430, obtaining the fake aircraft position 116.

Figure 4D:
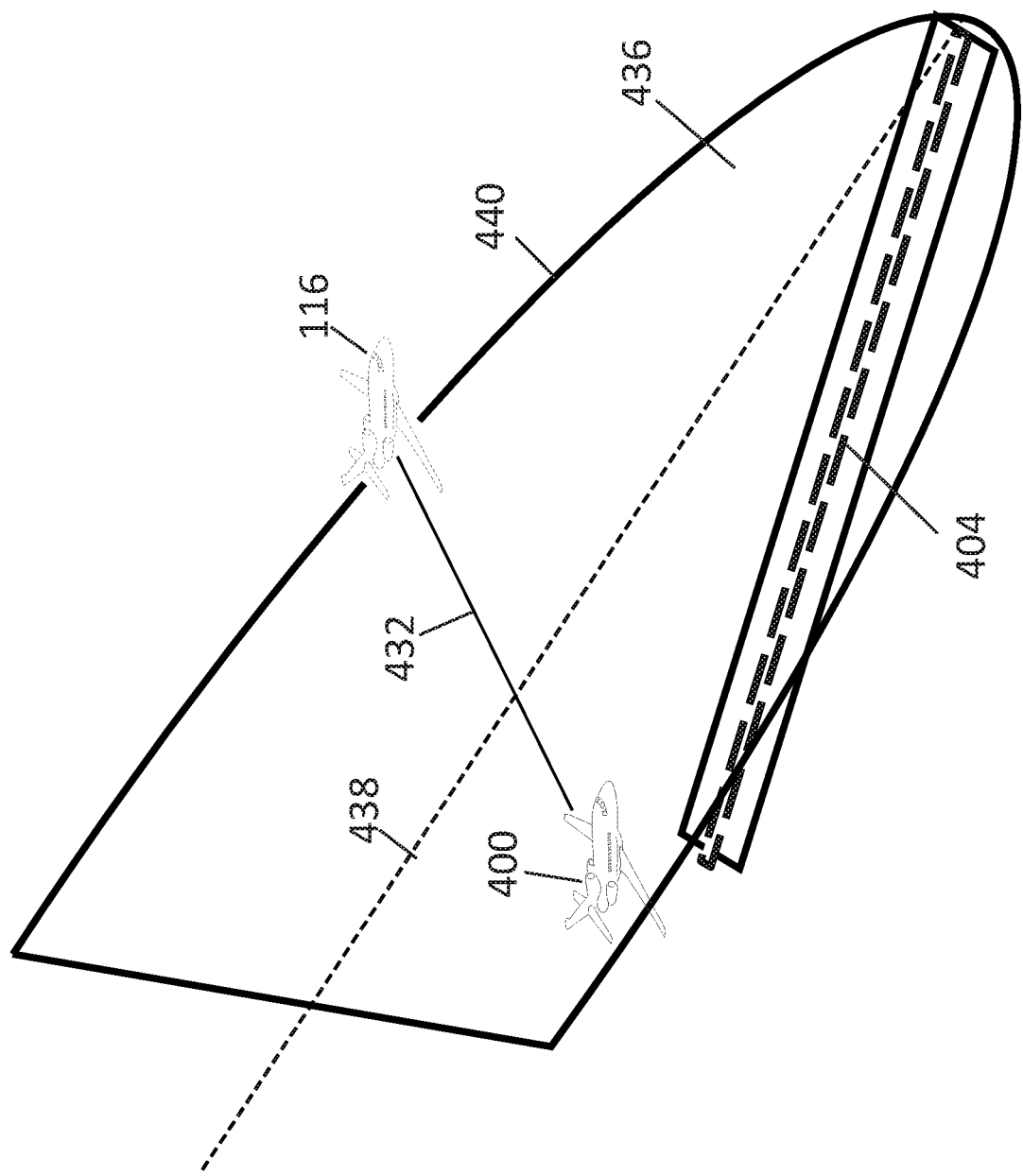
FIG. 4D represents a convex mirroring process for obtaining the fake aircraft positions.

FIG. 4D represents another example of a geometric projective transformation, in particular a convex mirroring process for obtaining the fake aircraft positions 116. A convex surface 440 (hyperbolic surface, in the example of FIG. 4D) aligned with the runway 404 is defined. The focus of the hyperbola is in the aiming point area of the runway 404, and the length of the hyperbola is such the area of interest is covered. For every actual aircraft position 400 inside the hyperbolic volume 436, a fake aircraft position 116 is calculated as the intersection of a line 432 perpendicular to the hyperbola transverse axis 438 with the hyperbolic surface 440.

Figure 5:
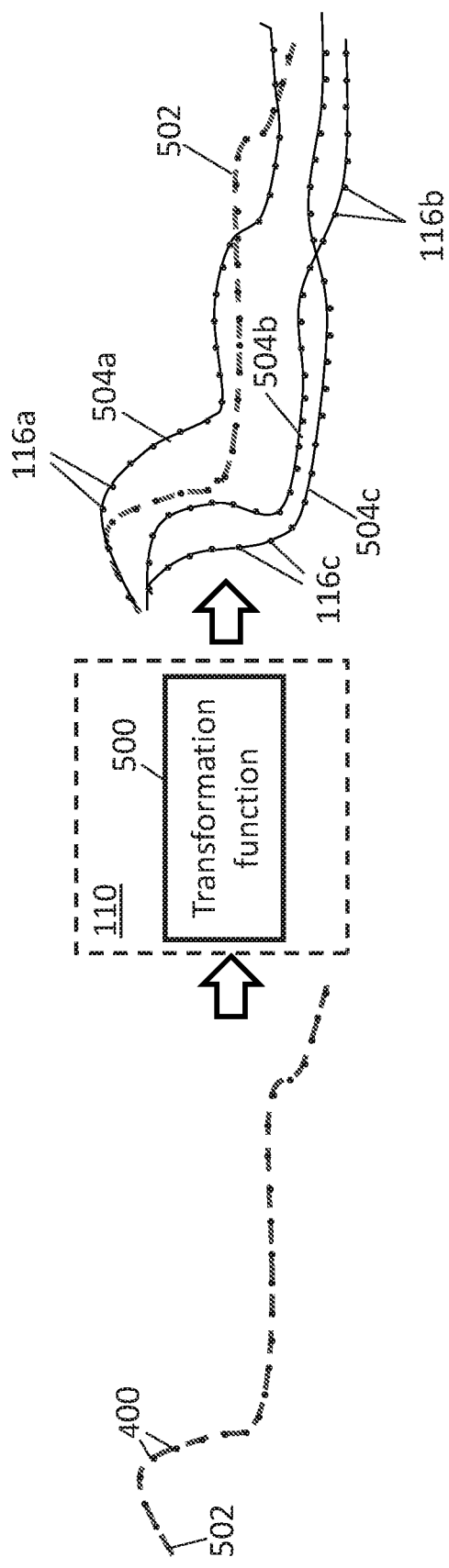
FIG. 5 depicts the application of a transformation function to actual aircraft positions.

The fake aircraft position generator 110 calculates, for each actual aircraft position 400, one or more fake aircraft positions 116 using a transformation function, a projective transformation that maps lines to lines (but not necessarily preserving parallelism). FIG. 5 depicts an example of the application of a transformation function 500 to a plurality of actual aircraft positions 400 defining an actual flight path 502. The output of the transformation function 500 is a set of fake flight paths (504a, 504b, 504c), each fake flight path being composed of a plurality of fake aircraft positions. In this depicted case the transformation function 500 converts the input, actual aircraft positions 400, into three different outputs, fake aircraft positions (116a, 116b, 116c). The transformation function 500 may convert each actual aircraft positions 400 into any number of fake aircraft positions (one or more).

In an embodiment, the transformation function 500 employed is a geometric projective transformation. For example, geometric projective transformations employed may be projections over a conical surface 410 (FIG. 4A), a convex surface 440 (FIG. 4D) or a frustum surface. The position and orientation of these surfaces may vary, although they are preferably with a relative position to the runway 404 such that the nearer the original points (actual aircraft positions 400) are to the runway 404 the more similar are the transformed points (fake aircraft positions 116) to the original ones. The surfaces of the geometric projective transformations may also be used to define the region of interest; in this case, the fake aircraft positions obtained by the geometric projective transformations define flight trajectories inside the region of interest.

The geometric projective transformation is a projection over a surface (a conical surface, a convex surface such as a hyperbolic, a frustum surface, etc.). The selected geometric projective transformation has the following properties: when applied to an actual aircraft position 400, the output is one or more fake aircraft positions 116, and when applied to a fake aircraft position 116, one of the outputs is the fake aircraft position 116 itself.

Figure 6:
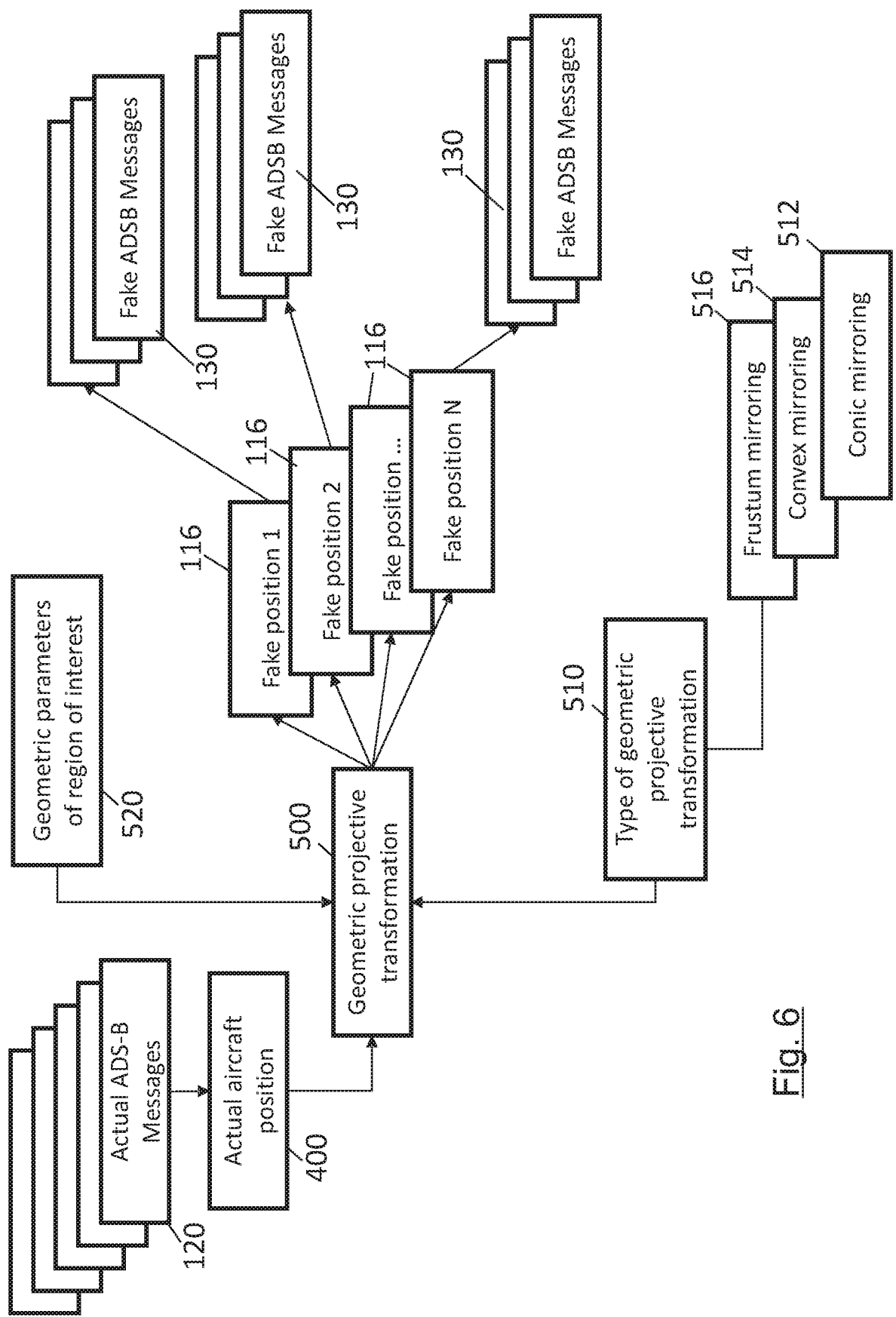
FIG. 6 shows a diagram of the obfuscation method in which a geometric projective transformation is used to obtain fake aircraft positions.

In an embodiment shown in FIG. 6, the transformation function 500 applied by the fake aircraft position generator 110 is a geometric projective transformation, such as a conic mirroring function or a convex mirroring function, although other geometric projections over different surfaces aligned with the runway can be employed, as long as they comply with the same properties. The geometric projective transformation 500 employs the geometric parameters of the region of interest 520 and the selected type of geometric projective transformation 510 (e.g. conic mirroring 512, convex mirroring 514, Frustum mirroring 516) to generate the required geometric transformation parameters. With these parameters the geometric projective transformation 500 is completely defined.

Figure 7:
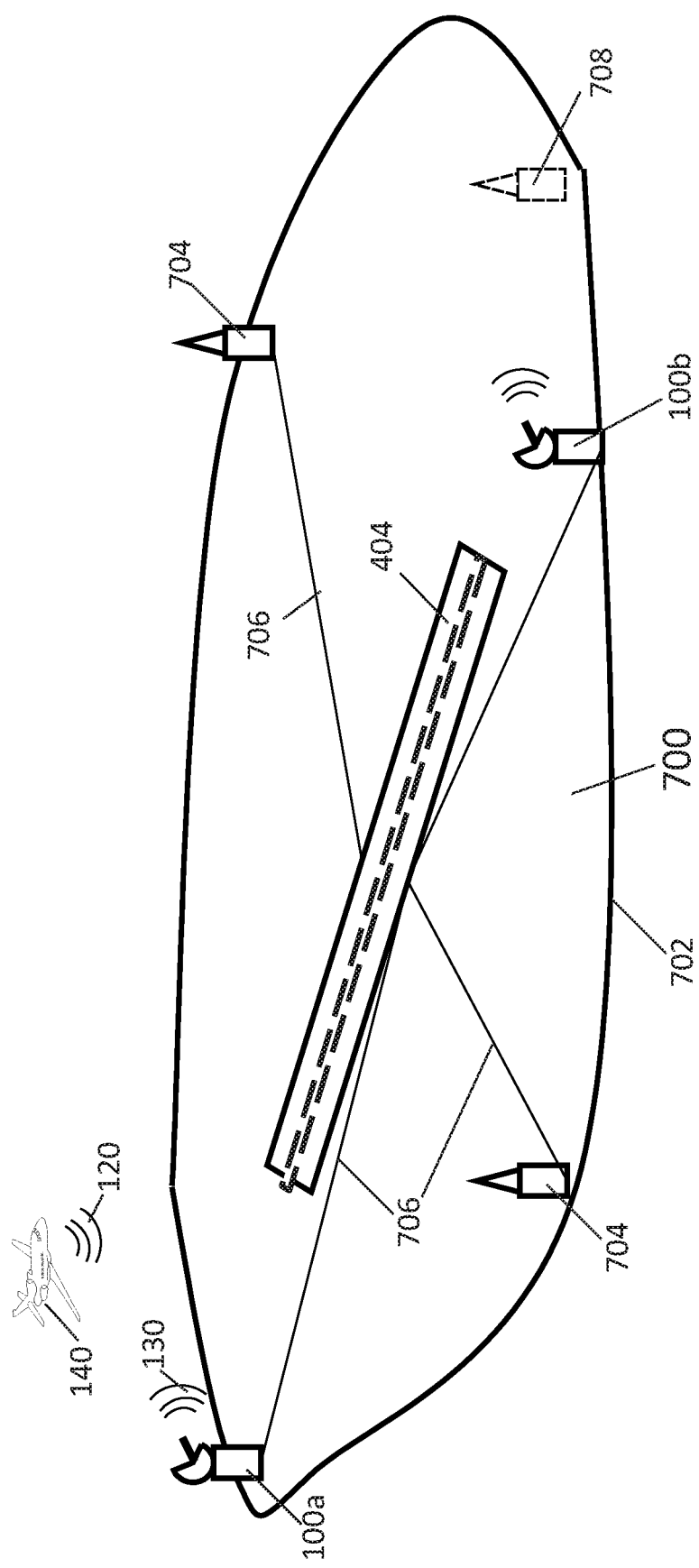
FIG. 7 represents a system comprising two different ground stations near a runway.

The system may comprise a plurality of ground stations 100 for protecting the privacy of ADS-B messages transmitted by an aircraft 140. FIG. 7 shows an overall view of the system comprising two different ground stations (100a, 100b) located near a runway 404. A region of interest 700 is defined by a close curve 702 surrounding the runway 404 and an altitude interval (e.g. 0-400 m).

An aircraft 140 equipped with "ADS-B Out" technology periodically broadcasts its position using ADS-B messages 120. In FIG. 7 a first ground station 100a is close enough to the aircraft 140 to receive the aircraft position 112 included in ADS-B messages 120. The first ground station 100a verifies that the aircraft 140 is located inside the region of interest 700 (in the example shown in FIG. 7, latitude and longitude defining a position within the area defined by the close curve 702, and altitude between 0 and 400 m). When the received aircraft position 112 included in an ADS-B message is outside the region of interest 700, the ground stations 100 do not further process the ADS-B message.

If the received aircraft position 112 is located inside the region of interest 700, the first ground station 100a additionally verifies that said aircraft position 112 is an actual aircraft position 400, and not a fake aircraft position 116 previously generated by another ground station. In that case, the first ground station 100a employs a transformation function 500 to derive from that aircraft position a number of alternative fake positions 116.

For each actual aircraft position 400 received, the first ground station 100a generates and broadcasts an array of fake ADS-B messages 130, each fake ADS-B message 130 incorporating a different fake aircraft position 116. All ground stations receiving ADS-messages (120,130) process them to broadcast fake aircraft positions if the operating conditions 114 are met. This way, when the aircraft 140 is close enough to a second ground station 100b, the latter receives the actual aircraft position 400 and broadcasts fake aircraft positions 116. If the second ground station 100b receives fake ADS-B messages 130 broadcast by the first ground station 100a, the second ground station 100b is aware that they contain fake aircraft positions 116 and do nothing.

Figure 8:
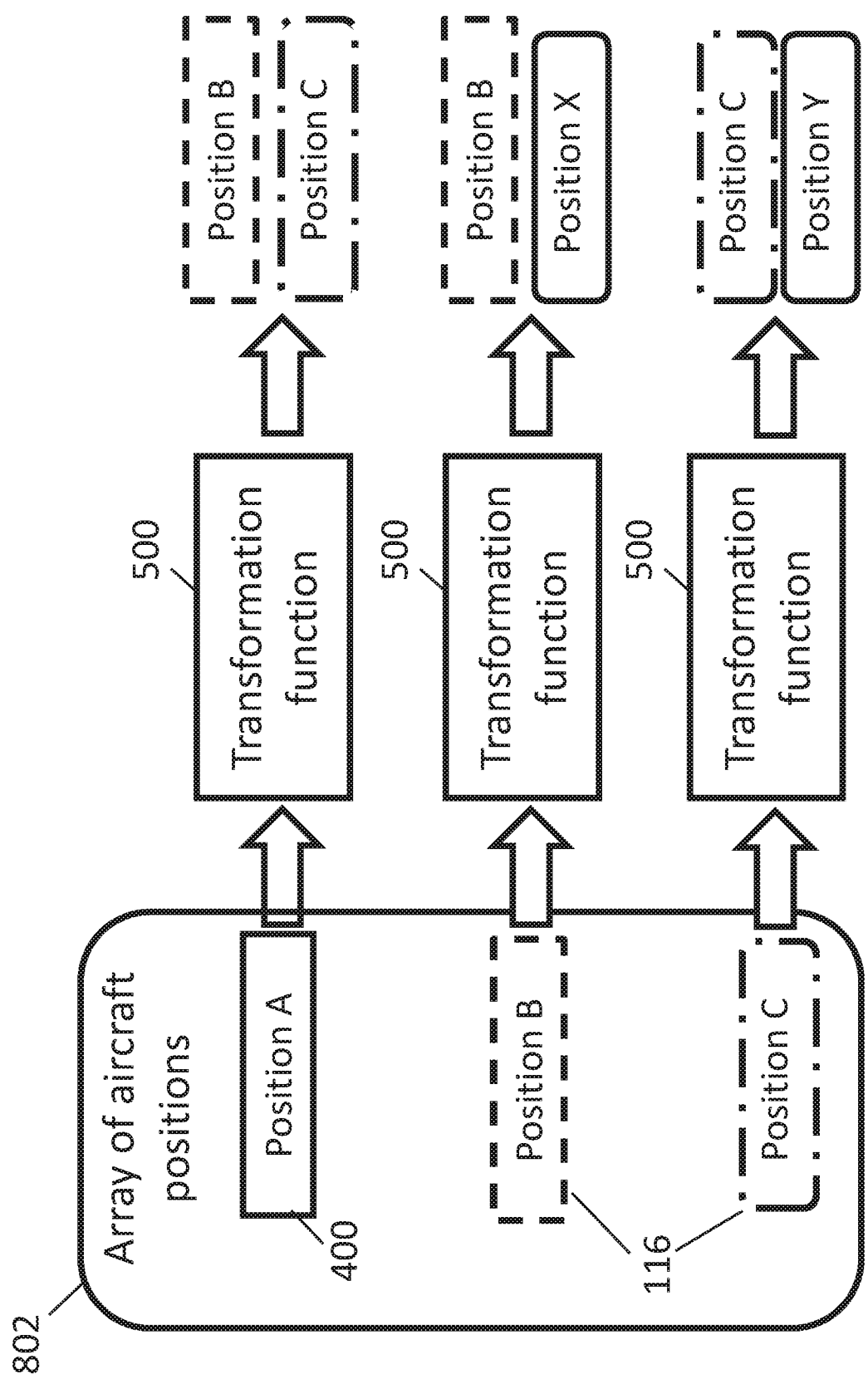
FIG. 8 shows the application of the transformation function to differentiate the actual aircraft position from the fake positions.

FIG. 7 also shows several trusted receivers 704 in the vicinity of the runway 404. Trusted receivers 704 receive both the actual aircraft position 400 transmitted from the aircraft 140 and the aircraft fake positions 116 broadcast by the first ground station 100a. As shown in FIG. 8, the trusted receivers 704 use the same transformation function 500 (i.e.

the transformation function previously used to calculate the fake aircraft positions 116) to differentiate the actual aircraft position 400 from the fake aircraft positions 116.

The key parameters to apply the transformation function 500 is shared among trusted receivers 704 and ground stations (100a, 100b), for instance using a secure wired network 706. This way the trusted receivers 704 can differentiate between fake ADS-B messages 130 and actual ADS-B messages 120. Similarly, the ground stations (100a, 100b) also use the transformation function 500.

On the contrary, untrusted receivers 708 receive both actual and fake aircraft positions, but cannot differentiate them since they are not aware of the transformation function 500 to apply. The untrusted receiver 708 receive ADS-B messages including the position of the aircraft 140, but they are not consistent since the aircraft 140 seems to follow several different paths at the same time. Therefore, untrusted receivers 708 cannot distinguish the actual position of the aircraft 140.

FIG. 8 depicts the application of a transformation function 500 to an array of aircraft positions 802 received during a short time interval by a trusted receiver 704 or a ground station (100a, 100b). In particular, the array of aircraft positions contains three different positions: position A, which corresponds to the actual aircraft position, and positions B and C, which are fake aircraft positions. To determine which position is the actual aircraft position 400, the transformation function 500 previously used to calculate the fake aircraft positions 116 is now applied.

When applying the transformation function 500 to position A, the other two positions B and C are obtained, which determines that position A is an actual aircraft position 400. However, when applying the transformation function 500 to position B, the position B itself is obtained along with another position (position X), which determines that position B is a fake aircraft position 116. Similarly, when applying the transformation function 500 to position C, the position C itself is obtained along with another position (position Y), which determines that position C is also a fake aircraft position 116. Therefore, the transformation function 500 applied to a fake aircraft position does not generate the other aircraft positions; however, the transformation function 500 applied to an actual aircraft position 400 generates all the other fake aircraft positions 116. This way the receiver can decide which ADS-B message is real and which is fake. In other words:

When applying the transformation function 500 to an actual aircraft position 400, the other fake aircraft positions 116 are obtained.

When a transformation function 500 is applied to a fake aircraft position 116, at least the same fake aircraft position 116 is obtained.

The invention claimed is:

1. A system for protecting the privacy of automatic dependent surveillance-broadcast (ADS-B) messages, the system comprising at least one ground station comprising:
   a ground ADS-B transponder configured for receiving an ADS-B message;
   a ground station control unit comprising:
   an aircraft position determination module for retrieving an aircraft position included in the ADS-B message;
   an operating conditions module for determining the fulfillment of one or more operating conditions, said operating conditions at least including determining if the aircraft position is an actual aircraft position; and
   a fake aircraft position generator for computing one or more fake aircraft positions using a geometric projective transformation of the actual aircraft position over a surface;
   wherein the ground station control unit is configured for broadcasting one or more fake ADS-B messages including the fake aircraft positions if the operating conditions are met.

2. The system of claim 1, wherein the operating conditions further includes determining if the aircraft position is located inside a region of interest.

3. The system of claim 1, wherein the operating conditions module is configured for determining if the aircraft position is an actual aircraft position by using the geometric projective transformation, the geometric projective transformation being such that:
   when applied to an actual aircraft position the geometric projective transformation generates the fake aircraft positions; and
   when applied to a fake aircraft position the geometric projective transformation generates at least the same fake aircraft position.

4. The system of claim 1, wherein the operating conditions further includes determining if the aircraft position is located inside a region of interest, and wherein the region of interest is defined by the surface used in the geometric projective transformation.

5. The system of claim 1, wherein the geometric projective transformation is a projection over a conical surface.

6. The system of claim 1, wherein the geometric projective transformation is a projection over a convex surface.

7. The system of claim 1, wherein the fake aircraft position generator is configured to retrieve data for the geometric projective transformation from a memory and to generate the geometric projective transformation.

8. A method of protecting the privacy of ADS-B messages, comprising:
   receiving an ADS-B message;
   retrieving an aircraft position included in the ADS-B message;
   determining the fulfillment of one or more operating conditions, said operating conditions at least including determining if the aircraft position is an actual aircraft position;
   in response to the operating conditions being met:
   generating one or more fake aircraft positions using a geometric projective transformation of the actual aircraft position over a surface; and
   broadcasting one or more fake ADS-B messages including the fake aircraft positions.

9. The method of claim 8, wherein the operating conditions further include determining if the aircraft position is located inside a region of interest.

10. The method of claim 8, wherein the step of determining if the aircraft position is an actual aircraft position comprises using the geometric projective transformation such that:
    when applied to an actual aircraft position the geometric projective transformation generates the fake aircraft positions; and
    when applied to a fake aircraft position the geometric projective transformation generates at least the same fake aircraft position.

11. The method of claim 8, wherein the geometric projective transformation is a projection over a conical surface.

12. The method of claim 8, wherein the geometric projective transformation is a projection over a convex surface.

13. The method of claim 8, further comprising:
retrieving data for the geometric projective transformation from a memory; and
generating the geometric projective transformation.

14. A system for protecting the privacy of automatic dependent surveillance-broadcast (ADS-B) messages, the system comprising:
an aircraft position determination module for retrieving an aircraft position included in an ADS-B message;
an operating conditions module for determining the fulfillment of one or more operating conditions, said operating conditions at least including determining if the aircraft position is an actual aircraft position;
a fake aircraft position generator for computing one or more fake aircraft positions using a geometric projective transformation over a surface; and
a transponder for broadcasting one or more fake ADS-B messages including the fake aircraft positions if the operating conditions are met.

15. The system of claim 14, wherein the operating conditions further include determining if the aircraft position is located inside a region of interest.

16. The system of claim 14, wherein the surface is a conical surface.

17. The system of claim 14, wherein the operating conditions module is configured for determining if the aircraft position is an actual aircraft position by using the geometric projective transformation, the geometric projective transformation being such that:
when applied to an actual aircraft position the geometric projective transformation generates the fake aircraft positions; and
when applied to a fake aircraft position the geometric projective transformation generates at least the same fake aircraft position.

18. The system of claim 14, wherein the surface is a convex surface.

19. The system of claim 14, wherein the fake aircraft position generator is configured to retrieve data for the geometric projective transformation from a memory and to generate the geometric projective transformation.

20. The system of claim 19, wherein the data includes the region of interest, maps, charts, or a combination thereof.

* * * * *